United States Patent
Chen

(10) Patent No.: US 11,146,533 B1
(45) Date of Patent: Oct. 12, 2021

(54) DETECTING AND PREVENTING PASSWORD LEAKAGE USING A DEVICE-LEVEL NETWORK FILTER

(71) Applicant: Symantec Corporation, Mountain View, CA (US)

(72) Inventor: Ming Chen, Redondo Beach, CA (US)

(73) Assignee: NortonLifeLock, Inc., Tempe, AZ (US)

( * ) Notice: Subject to any disclaimer, the term of this patent is extended or adjusted under 35 U.S.C. 154(b) by 281 days.

(21) Appl. No.: 16/363,344

(22) Filed: Mar. 25, 2019

(51) Int. Cl.
*H04L 29/06* (2006.01)
*H04L 12/46* (2006.01)

(52) U.S. Cl.
CPC ...... *H04L 63/0245* (2013.01); *H04L 12/4641* (2013.01); *H04L 63/083* (2013.01); *H04L 63/1408* (2013.01); *H04L 63/1441* (2013.01)

(58) Field of Classification Search
CPC ............. H04L 63/0245; H04L 63/1408; H04L 63/083; H04L 63/1441; H04L 12/4641
See application file for complete search history.

(56) References Cited

U.S. PATENT DOCUMENTS

| | | | | |
|---|---|---|---|---|
| 10,051,001 | B1* | 8/2018 | Ashley | H04L 63/14 |
| 10,356,125 | B2* | 7/2019 | Goutal | G06F 21/6263 |
| 10,917,401 | B1* | 2/2021 | Mantin | G06F 9/54 |
| 2020/0082124 | A1* | 3/2020 | Pedersen | G06F 21/45 |
| 2021/0044618 | A1* | 2/2021 | Lofthouse | H04L 63/083 |

OTHER PUBLICATIONS

Credential Phishing Prevention, https://docs.paloaltonetworks.com/pan-os/8-0/pan-os-new-features/content-inspection-features/credential-phishing-prevention, Palo Alto Networks, 2019.
1Password X—Password Manager, https://chrome.google.com/webstore/detail/1password-x-%E2%80%93-password-ma/aeblfdkhhhdcdjpifhhbdiojplfincoa?hl=en, 1password.com, version 1.14.2, Mar. 11, 2109.
Network Extension, https://developer.apple.com/documentation/networkextension?language=objc#overview, Apple Developer Documentation, viewed Mar. 8, 2019.

(Continued)

*Primary Examiner* — Christopher A Revak
(74) *Attorney, Agent, or Firm* — Brill Law Office; Jeffrey Brill

(57) ABSTRACT

A user name, password and associated domain are stored for each account managed by a password manager on a computing device. A device-level network extension filters network traffic. Passwords are identified in outbound network traffic. Target domains to which identified passwords are being transmitted are compared to stored domains associated with the identified passwords. Based on results of these comparisons, it is determined whether attempts to transmit passwords to target domains are legitimate or not. In response to determining that a specific attempt to transmit a password to a target domain is legitimate, the transmission is allowed to proceed. Responsive to determining that a given attempt to transmit a password to a target domain is not legitimate, a corresponding security action is taken. For example, the connection over which the non-legitimate password transmission attempt is being made can be terminated, or the transmission attempt can be blocked.

21 Claims, 4 Drawing Sheets

(56) References Cited

OTHER PUBLICATIONS

NEPacketTunnelProvider, https://developer.apple.com/documentation/networkextension/nepackettunnelprovider?language=objc, viewed Mar. 8, 2019.
What's New in Network Extension and VPN, https://developer.apple.com/videos/play/wwdc2015/717/, Apple Inc., 2015.
Norton Password Manager for iOS, https://itunes.apple.com/us/app/nortonpassword-manager/id504750161?mt=8, Symantec, 2018.
Macmichael, Duncan, Introduction to Network Drivers, https://docs.microsoft.com/en-us/windows-hardware/drivers/network/introduction-to-network-drivers, Apr. 19, 2017, 3819 pgs.

* cited by examiner

DETECTING AND PREVENTING PASSWORD LEAKAGE USING A DEVICE-LEVEL NETWORK FILTER

TECHNICAL FIELD

This disclosure pertains generally to computing device security, and more specifically to detecting and preventing password leakage using a device-level network filter.

BACKGROUND

Computer users today are required to have accounts on many different systems, such as work and home networks, multiple email systems, banks and other financial institutions, shopping websites, etc. Each account requires a username and password. Phishing and malware attempts to steal user names and passwords, to obtain unauthorized access to these accounts.

It is also difficult for users to create and remember separate strong passwords for so many accounts. Using a single password for all accounts is insecure, because if the user's single password is stolen or discovered for one account, the unauthorized party can gain access to all of the user's accounts. Writing down passwords presents the risk of the written document being lost, stolen or viewed by an unauthorized party. For all of these reasons, many users today utilize password managers, which store the user's passwords and corresponding usernames for all of the user's accounts in a secure manner (e.g., on a secure server in the cloud or encrypted on the user's device). When the user attempts to login to a corresponding account (e.g., visits a login page of a website with a browser), the password manager enter the username and password automatically. Password managers have many benefits, but there is malware that attempts to steal user names and passwords when a password manager provides them to a login page or the like over the network.

It would be desirable to address these issues.

SUMMARY

A password leak detection manager runs on a computing device, and automatically detects and prevents attempts to transmit passwords to unauthorized domains. In some embodiments, the computing device is a mobile computing device such as a smartphone or tablet running a mobile operating system such as iOS or Android. In other embodiments, the computing device is a desktop or laptop computer running an operating system such as macOS, Windows or Linux. A password manager runs on the computing device, as well as a computing device-level network extension.

The user name, password and associated domain are stored for each account managed by the password manager for a given user. The device-level network extension filters network traffic. The device-level network extension can filter network traffic at a computing device-level, without using a remote server. For example, in some embodiments the device-level network extension is configured to provide device-level virtual private network (VPN) functionality, without using a VPN server. In some embodiments, the filtering of network traffic can be instantiated by calling an application programming interface (API) to extend core operating system network features, without using a remote server (e.g., a NEPacketTunnelProvider API to extend core iOS or macOS network features). In other embodiments, the filtering of network traffic can be instantiated in the form of an operating system kernel network driver, such as a Windows kernel driver used to capture network traffic and filter username/password/domain and the like.

Passwords are identified in outbound network traffic. This can take the form of identifying username/password pairs and/or unpaired passwords. Target domains to which identified passwords are being transmitted are compared to stored domains associated with the identified passwords. Based on the results of these comparisons, it is determined whether attempts to transmit passwords to target domains are legitimate or not. In response to determining that a specific attempt to transmit a specific password to a specific target domain is legitimate, the transmission is allowed to proceed. On the other hand, responsive to determining that a given attempt to transmit a specific password to a specific target domain is not legitimate, a corresponding security action is taken. For example, the connection over which the non-legitimate password transmission attempt is being made can be terminated, or the transmission attempt can be blocked. In one embodiment, the unauthorized attempt to transmit the password to the target domain is reported to a central security server. In one embodiment, a scan for malware can be automatically triggered on the computing device. Other options include automatically outputting a warning (e.g., to a user of the computing device) concerning the non-legitimate attempt to transmit the password to the given target domain, or automatically prompting the user to take an additional action.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
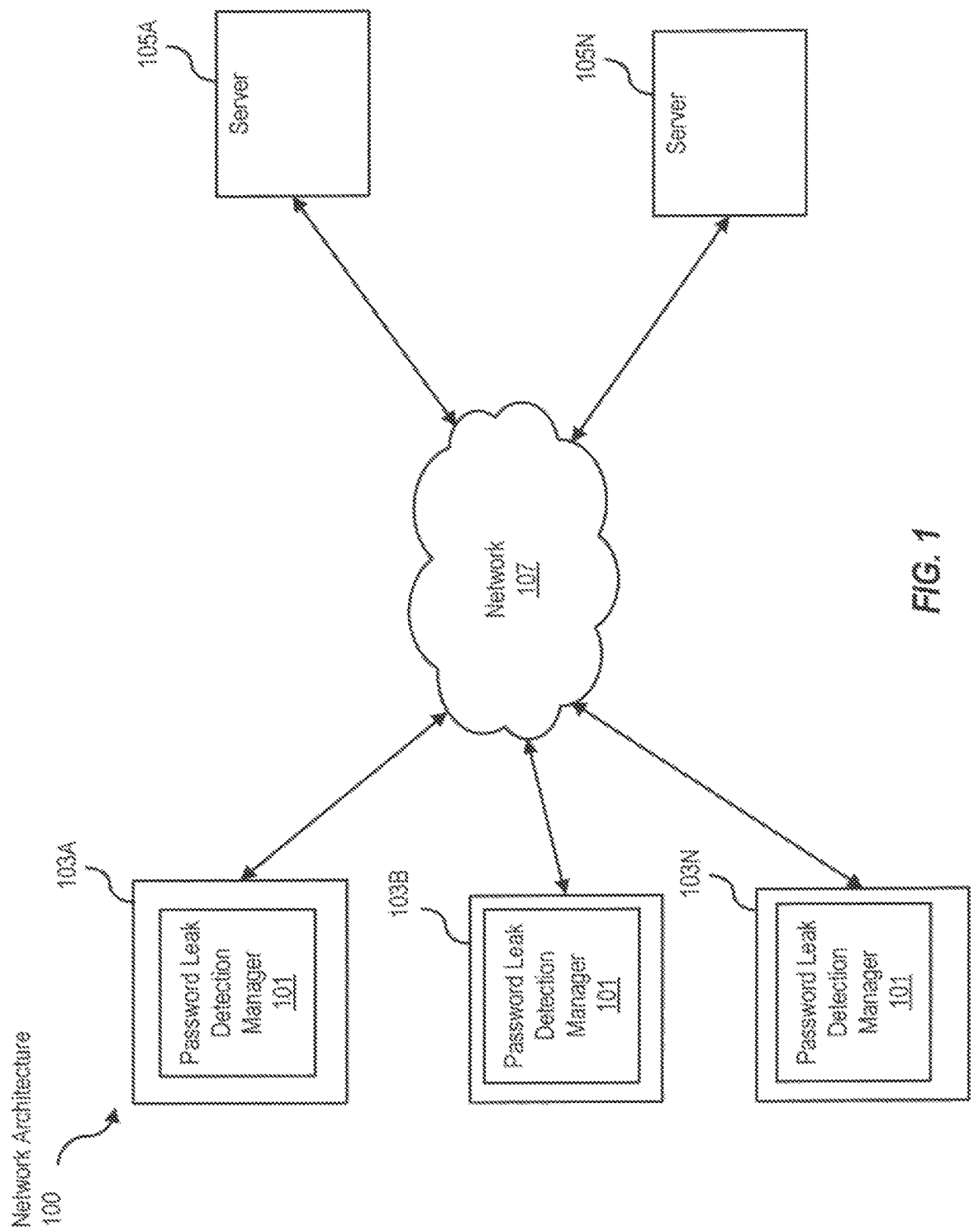
FIG. 1 illustrates a network architecture in which a password leak detection manager can operate, according to some embodiments.

FIG. 1 is a block diagram illustrating an exemplary network architecture 100 in which a password leak detection manager 101 can be implemented. As described in detail below, the password leak detection manager 101 prevents the theft, leakage and loss of usernames and passwords from the user's computing device 210, at a computing device-level, without requiring the use of a server 105. As further described below, the password leak detection manager 101 can work in conjunction with a password manager 301 to protect the user's passwords and username/password pairs.

The illustrated network architecture 100 comprises multiple clients 103A, 103B and 103N, as well as multiple servers 105A and 105N. In FIG. 1, a password leak detection manager 101 is illustrated as residing on each client 103A-N. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of mobile computing devices, comprising portable computer systems capable of connecting to a network 107 and running applications (e.g., smartphones, tablet computers, wearable computing devices, etc.). Clients may also be in the form of laptops, desktops and/or other types of computers/computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
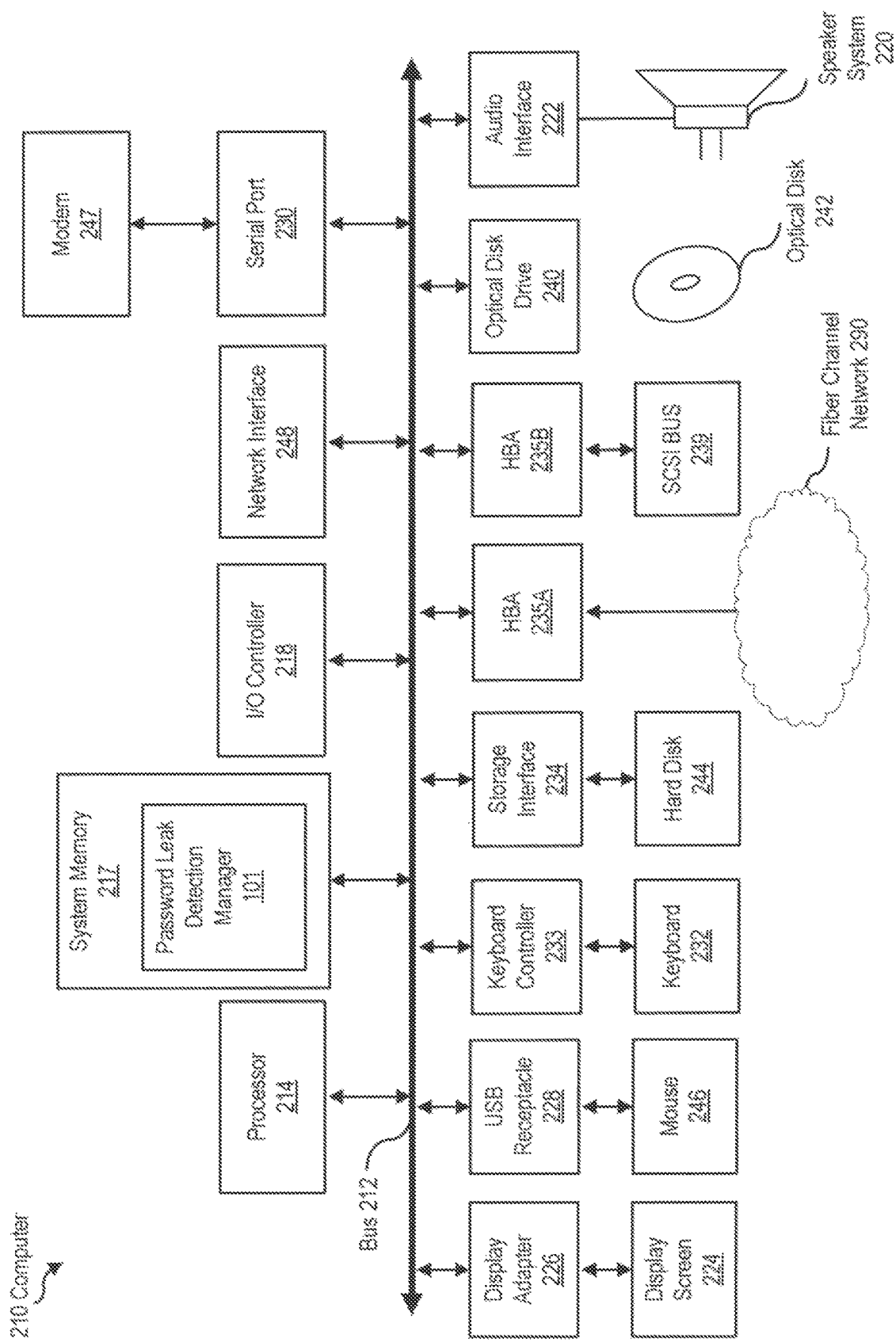
FIG. 2 is a block diagram of a computer system suitable for implementing a password leak detection manager, according to some embodiments.

FIG. 2 is a block diagram of a computing device 210 suitable for implementing a password leak detection manager 101. Both clients 103 and servers 105 can be implemented in the form of such computer systems 210. As illustrated, one component of the computing device 210 is a bus 212. The bus 212 communicatively couples other components of the computing device 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) ports 228, serial ports 230, etc., a keyboard controller 233 communicatively coupled to a keyboard 232, a storage interface 234 communicatively coupled to at least one hard disk 244 (or other form(s) of data storage media such as solid state drives (SSDs)), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computing device 210), for example via the network interface 248 or modem 247. In FIG. 2, the password leak detection manager 101 is illustrated as residing in system memory 217. The workings of the password leak detection manager 101 are explained in greater detail below in conjunction with FIGS. 3-5.

The storage interface 234 is coupled to one or more hard disks 244 (and/or other standard storage media such as SSDs). The hard disk(s) 244 may be a part of computing device 210, or may be physically separate and accessed through other interface systems.

The network interface 248 and or modem 247 can be directly or indirectly communicatively coupled to a network 107 such as the internet. Such coupling can be wired or wireless.

Figure 3:
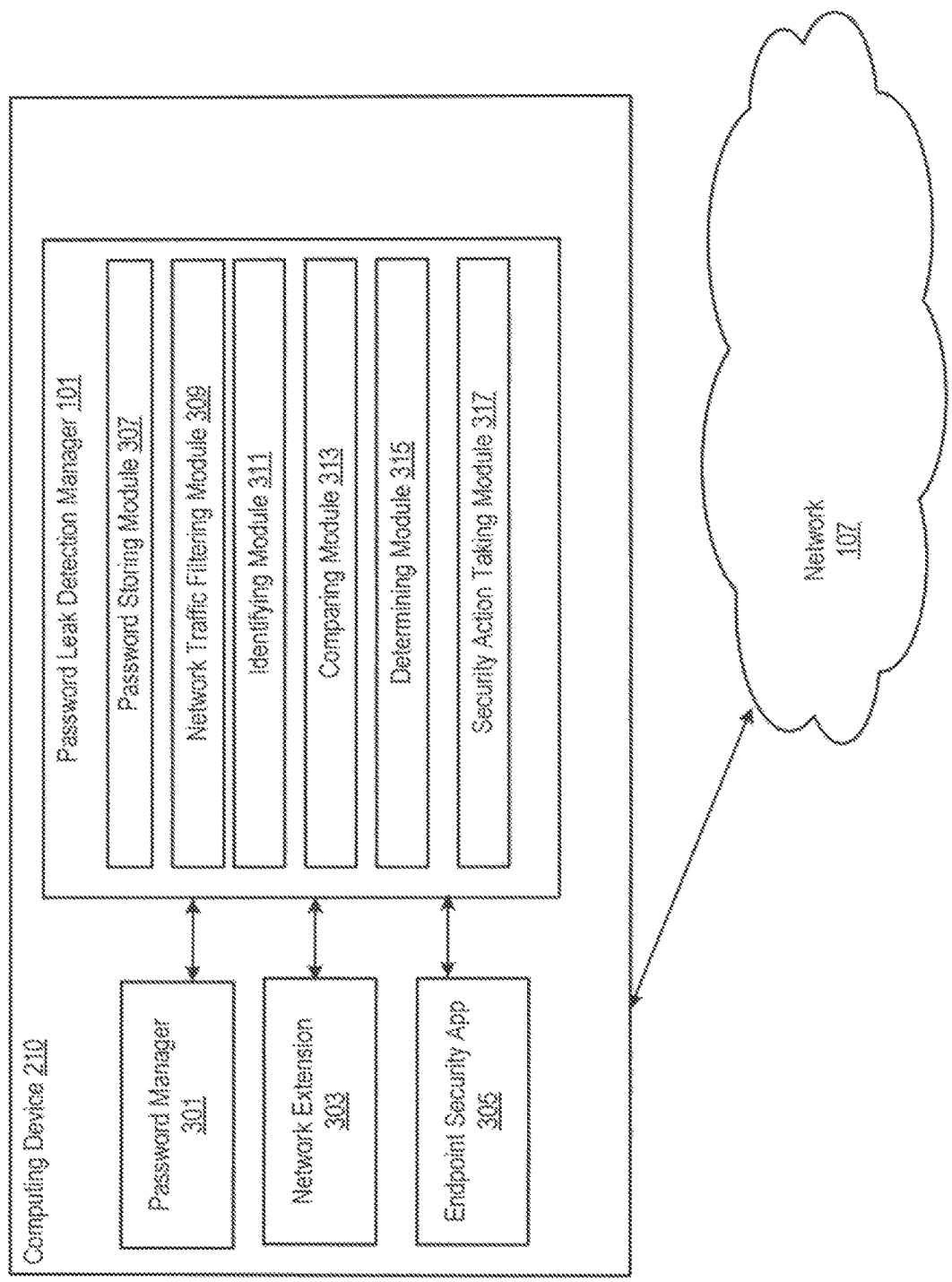
FIG. 3 is a block diagram of a password leak detection manager operating on a computing device in a networked environment, according to some embodiments.

FIG. 3 illustrates the operation of a password leak detection manager 101, according to some embodiments. As described above, the functionalities of the password leak detection manager 101 can reside on a client 103, a server 105, or be distributed between multiple computer systems 210, including within a cloud-based computing environment in which the functionality of the password leak detection manager 101 is provided as a service over a network 107.

FIG. 3 illustrates a specific multiple module instantiation of a password leak detection manager 101, according to some embodiments. It is to be understood that although the password leak detection manager 101 is illustrated as a single entity, the illustrated password leak detection manager 101 represents a collection of functionalities, which can be instantiated as a single or multiple modules as desired (an instantiation of specific, multiple modules of the password leak detection manager 101 according to one embodiment is illustrated in FIG. 3). It is to be understood that the modules of the password leak detection manager 101 can be instantiated (for example as object code or executable images) within the system memory 217 (e.g., RAM, ROM, flash memory) of any computing device 210, such that when the processor 214 of the computing device 210 processes a module, the computing device 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the password leak detection manager 101 can be stored on computer-readable storage media. Any form of tangible computer readable storage medium can be used in this context, such as magnetic, solid state or optical storage media. As used herein, the term "computer readable storage medium" does not mean an electrical signal separate from an underlying physical medium.

Figure 4:
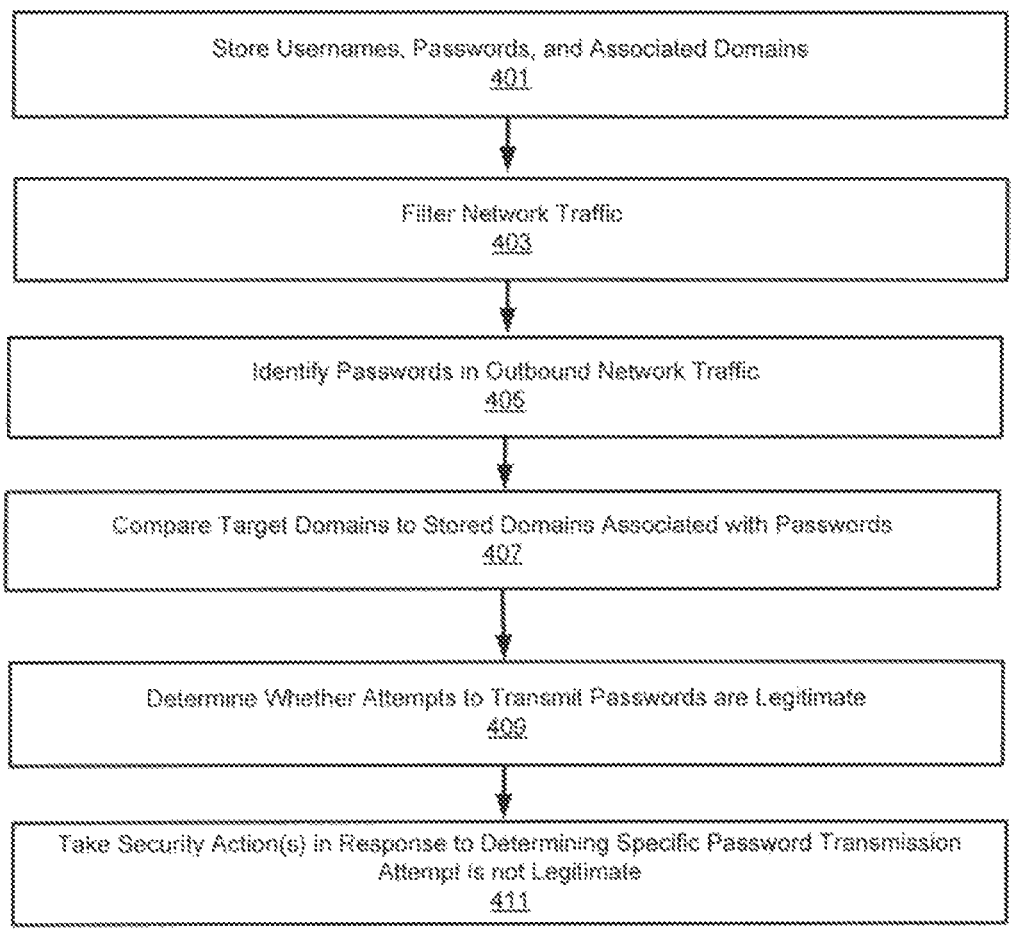
FIG. 4 is a flowchart illustrating operations of a password leak detection manager, according to some embodiments.

FIG. 4 illustrates steps executed by the password leak detection manager 101, according to some embodiments. For clarity of description, the subject matter illustrated in FIGS. 3 and 4 is described together below.

In the embodiment illustrated in FIG. 3, a password leak detection manager 101 runs on a computing device 210 which is connected to a network 107. In some embodiments, the computing device 210 is a mobile device such as a smartphone or tablet running a mobile operating system such as iOS, Android, etc. In some embodiments, the password leak detection manager 101 is implemented in the form of an app which runs on the mobile computing device (for example, an iOS app). In other embodiments, the password leak detection manager 101 can run on other types of computing devices, such as laptops or desktops running other operating systems such as macOS, Windows, Linux, etc. In these embodiments, the password leak detection manager 101 can be instantiated in the form of an application configured for the given operating system (for example, a macOS application) or as a browser extension or the like.

A password manager 301 runs on the computing device 210. In some embodiments, the password leak detection manager 101 is instantiated as part of or otherwise in conjunction with the password manager 301. A network extension 303 is also illustrated as residing on the computing device 210. In some embodiments, the password leak detection manager 101 is further or instead instantiated as part of or otherwise in conjunction with an endpoint security app/application 305, which may in turn interface with a backend/cloud based security system (not illustrated).

As described in more detail below, the network extension 303 provides network filtering functionality at the level of the computing device 210, without using a server for this purpose. In some embodiments, the network extension provides device-level virtual private network (VPN) functionality (e.g., as opposed to using a backend VPN server). In some embodiments, the network extension 303 is in the form of an iOS or macOS network extension that uses the NEPacketTunnelProvider class, its subclasses and its family of APIs, which are provided as a tool for developers by Apple. In these embodiments, the password leak detection manager 101 is in the form of an iOS app, a macOS application, or a browser extension or the like, which may use the NEPacketTunnelProvider application programming interface(s) (APIs) to extend the core iOS or macOS network features. In other embodiments, similar or other Apple or third party tools are used by the network extension 303 in context as desired. In other embodiments the network extension 303 is built under other operating systems using other tools to extend the network services of those operating systems.

A password storing module 307 of the password leak detection manager 101 works in conjunction with (or as a part of) the password manager 301 and securely stores 401 the user names, passwords and associated domains for each account of the user of the computing device 210. Because the password storing module 307 stores this information, the password leak detection manager 101 knowns which username/password pairs are associated with which legitimate websites. For example, it could be known that a first username/password pair is for logging on to, e.g., the user's account at Amazon.com, whereas a second pair is associated with the user's 401K account at Fidelity, a third pair with the user's Citibank personal checking account, and so on for each username/password pair managed by the password manager 301.

A network traffic filtering module 309 of the password leak detection manager 101 works in conjunction with (or as a part of) the network extension 305, and intercepts and filters 403 all the outbound network traffic from the computing device 210.

An identifying module 311 of the password leak detection manager 101 can identify 405 username/password pairs (as well as unpaired passwords) in the intercepted network traffic. In some embodiments the identifying module identifies all username/password pairs in the outbound network traffic. In other embodiments, the identifying module 311 also (or instead) identifies unpaired passwords in the outbound traffic. The level at which to identify passwords is a variable design parameter. By identifying all username/password pairs (and/or unpaired passwords) in the outbound network traffic from the computing device 210, any attempt to send a password to an unauthorized website (e.g., by malware on the user's device) can be detected and blocked as described below.

When a username/password pair (and/or an unpaired password in some embodiments) is intercepted in the outbound network traffic, a comparing module 313 of the password leak detection manager 101 compares 407 the target destination to which the username/password pair is being transmitted with the stored associated domain for the given username/password pair. By making this comparison, the comparing module 313 can determine whether the destination domain matches the stored domain for the given username/password pair which was gleaned from the password manager 301.

Responsive to the results of the comparing, a determining module 315 of the password leak detection manager 101 determines 409 whether the attempt to transmit the username/password pair to the target domain is legitimate. In response to the target domain matching the stored associated domain, the determining module 315 determines that the attempted transmission of the username/password pair is legitimate, and the transmission is allowed to proceed. On the other hand, in response to the destination domain not matching the stored associated domain for the username/password pair, the determining module 315 determines that the attempted transmission of the username/password is not legitimate (e.g., an attempt is being made to transmit the username/password to a domain other than the one with which it is associated as per the password manager 301).

In response to a determination that the attempted transmission of the username/password is not legitimate, a security action taking module 317 of the password leak detection manager 101 takes 411 one or more security actions. Different security actions may be taken by the security action taking module 317 in this context depending upon the circumstances (e.g., the specific target domain, the specific account, user and/or administrator settings, etc.). For example, the connection over which the attempt to transmit the username/password pair is being made can be terminated, the attempted transmission can be blocked, the attempt and the target domain can be reported to a central security server (not illustrated), a scan for malware can be automatically triggered on the user's computing device 210, the user can be warned and/or prompted to take additional action (e.g., via a user interface), etc. Rules can be defined specifying which security actions to take at any level of granularity.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures, and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method for detecting and preventing password leakage from a computing device using a device-level network extension and a password manager, the method comprising:
   storing a user name, a password and a domain with which the user name and the password are associated, for each account managed by the password manager;
   intercepting and filtering outbound network traffic locally within the computing device, by the device-level network extension;
   identifying passwords in the outbound network traffic intercepted and filtered by the device-level network extension;
   comparing target domains to which identified passwords are being transmitted to stored domains associated with identified passwords;
   determining whether attempts to transmit passwords to target domains are legitimate, based on results of the comparing; and
   responsive to determining that a specific attempt to transmit a specific password to a specific target domain is not legitimate, taking a corresponding security action.

2. The method of claim 1 wherein filtering outbound network traffic locally within the computing device, by the device-level network extension, further comprises:
   filtering outbound network traffic at a computing device-level, by the device-level network extension, without using a remote server.

3. The method of claim 1 wherein filtering network traffic, by the device-level network extension, further comprises:
   providing device-level virtual private network (VPN) functionality, by the device-level network extension, without using a VPN server.

4. The method of claim 1 wherein the computing device further comprises:
   a mobile computing device running a mobile operating system.

5. The method of claim 4 wherein:
   the mobile operating system further comprises iOS.

6. The method of claim 1 wherein the computing device further comprises:
   a computing device running macOS.

7. The method of claim 1 wherein filtering network traffic, by the device-level network extension, further comprises:
   calling an application programming interface (API) to extend core operating system network features, without using a remote server.

8. The method of claim 7 wherein filtering network traffic, by the device-level network extension, further comprises:
   calling a NEPacketTunnelProvider API to extend core iOS or macOS network features.

9. The method of claim 1 wherein filtering network traffic, by the device-level network extension, further comprises:
   filtering network traffic using an operating system kernel network driver.

10. The method of claim 1 wherein identifying passwords in outbound network traffic further comprises:
    identifying username/password pairs in outbound network traffic.

11. The method of claim 1 wherein identifying passwords in outbound network traffic further comprises:
    identifying unpaired passwords in outbound network traffic.

12. The method of claim 1 wherein identifying passwords in outbound network traffic further comprises:
    identifying username/password pairs and unpaired passwords in outbound network traffic.

13. The method of claim 1 wherein taking a security action further comprises:
    terminating a connection over which the specific attempt to transmit the specific password to the specific target domain is being made.

14. The method of claim 1 wherein taking a security action further comprises:
    blocking the specific attempt to transmit the specific password to the specific target domain.

15. The method of claim 1 wherein taking a security action further comprises:
    reporting the specific attempt to transmit the specific password to the specific target domain to a central security server.

16. The method of claim 1 wherein taking a security action further comprises:
    automatically triggering a scan for malware on the computing device.

17. The method of claim 1 wherein taking a security action further comprises:
    automatically outputting a warning concerning the specific attempt to transmit the specific password to the specific target domain.

18. The method of claim 1 wherein taking a security action further comprises:
    automatically prompting a user of the computing device to take an additional action concerning the specific attempt to transmit the specific password to the specific target domain.

19. The method of claim 1 further comprising:
    determining that a specific attempt to transmit a specific password to a specific target domain is legitimate; and
    allowing the specific attempt to transmit the specific password to the specific target domain to proceed.

20. At least one non-transitory computer readable storage medium for detecting and preventing password leakage from a computing device using a device-level network extension and a password manager, the at least one non-transitory computer readable storage medium storing computer executable instructions that, when loaded into computer memory and executed by at least one processor of the computing device, cause the computing device to perform the following steps:

storing a user name, a password and a domain with which the user name and password are associated, for each account managed by the password manager;

intercepting and filtering outbound network traffic locally within the computing device, by the device-level network extension;

identifying passwords in the outbound network traffic intercepted and filtered by the device-level network extension;

comparing target domains to which identified passwords are being transmitted to stored domains associated with identified passwords;

determining whether attempts to transmit passwords to target domains are legitimate, based on results of the comparing; and responsive to determining that a specific attempt to transmit a specific password to a specific target domain is not legitimate, taking a corresponding security action.

21. A computing device comprising:

system memory;

a device-level network extension;

a password manager residing in the system memory;

a password storing module residing in the system memory, the password storing module being programmed to store a user name, a password and a domain with which the user name and password is associated, for each account managed by the password manager;

a network traffic filtering module residing in the system memory, the network traffic filtering module being programmed to intercept and filter outbound network traffic locally within the computing device, in conjunction with the device-level network extension;

an identifying module residing in the system memory, the identifying module being programmed to identify passwords in the outbound network traffic intercepted and filtered by the device-level network extension;

a comparing module residing in the system memory, the comparing module being programmed to compare target domains to which identified passwords are being transmitted to stored domains associated with identified passwords;

a determining module residing in the system memory, the determining module being programmed to determine whether attempts to transmit passwords to target domains are legitimate, based on results of the comparing;

a security action taking module residing in the system memory, the security action taking module being programmed to take a corresponding security action, responsive to determining that a specific attempt to transmit a specific password to a specific target domain is not legitimate; and at least one processor configured to execute the modules.

* * * * *